United States Patent

Milano, Jr.

[11] Patent Number: 5,990,586
[45] Date of Patent: Nov. 23, 1999

[54] MULTI-ACTUATOR HAVING POSITION CONTROLLER

[75] Inventor: Arthur J. Milano, Jr., Burlington, Conn.

[73] Assignee: Seitz Corporation, Torrington, Conn.

[21] Appl. No.: 09/102,147

[22] Filed: Jun. 22, 1998

Related U.S. Application Data

[60] Provisional application No. 60/050,448, Jun. 23, 1997.

[51] Int. Cl.[6] .................................................. H02K 7/10
[52] U.S. Cl. ........................ 310/75 R; 310/99; 310/83; 318/663; 318/666; 318/12; 318/9; 318/15; 318/667; 318/670; 318/664; 338/164; 338/184; 338/199
[58] Field of Search ...................... 318/663, 666, 318/12, 9, 15, 667, 670, 664; 338/164, 184, 199; 310/99, 85

[56] References Cited

U.S. PATENT DOCUMENTS

| | | | |
|---|---|---|---|
| 3,558,945 | 1/1971 | Hulle | 310/101 |
| 3,735,325 | 5/1973 | Akashi | 338/164 |
| 4,311,946 | 1/1982 | Pathmann | 318/663 |
| 4,616,164 | 10/1986 | Kenny et al. | 318/666 |
| 4,902,953 | 2/1990 | Kraft et al. | 318/663 |
| 4,931,710 | 6/1990 | DeVara et al. | 318/663 |
| 4,950,965 | 8/1990 | Kenny et al. | 318/560 |
| 5,053,661 | 10/1991 | Kitamura et al. | 310/99 |
| 5,184,039 | 2/1993 | Kraft | 310/89 |
| 5,404,060 | 4/1995 | Nakahashi et al. | 310/83 |

*Primary Examiner*—Clayton LaBalle
*Assistant Examiner*—Thanh Lam
*Attorney, Agent, or Firm*—Dallett Hoopes

[57] ABSTRACT

Feedback potentiometer-type servoactuator uses the ring gear of a planetary gear system to drive the wiper across a resistive arc of less than 360° where the actuator has a travel of multiple turns. The ring gear is supported by spaced struts in the actuator housing.

3 Claims, 3 Drawing Sheets

MULTI-ACTUATOR HAVING POSITION CONTROLLER

This application is related to the Applicant's provisional application Ser. No. 60/050,448 filed Jun. 23, 1997, now abandoned.

FIELD OF THE INVENTION

This invention relates to an electromechanical device for controlling the position of a door in an environmental control system, or the like. More specifically, the invention relates to such a device including a feedback potentiometer-type servoactuator wherein the drive shaft makes a rotation of more than 360° to effect the full travel of the door.

BACKGROUND OF THE INVENTION

Prior art devices have included several mechanisms wherein the rotary position of a door or the like has been actuated by a drive which drives the door to a position corresponding to the position to which an electric control element has been set. For instance, in the U.S. Pat. No. 4,616,164 to Kenny et al issued Oct. 7, 1986 there is disclosed a feedback servoactuator in which a motor drive drives a gear segment which mounts a wiper bridging across a conductive swipe and a resistive swipe disposed on a card adjacent the gear segment. Input of voltage determined by the position of the wiper is connected to a circuitry for a Wheatstone bridge. The Wheatstone bridge is also connected to a control voltage input determined by the setting of a potentiometer which is the command control element. The circuitry drives the actuator until a balance between the inputs is achieved.

Feedback servoactuators are employed in numerous applications where it is desired to rotate a shaft to a desired rotary position in response to an electrical command position signal. In the past such servoactuators have been used in vehicles to control the flapper door of an environmental air-conditioning system used to control the flow of heated or cooled air into the passenger compartment of a vehicle. Such applications require that the position of the door or vane be controlled in a range of, say 180°. This has been accomplished by directly linking the shaft of the gear on which the wiper is mounted directly to the vane.

There is a need for an actuator in which the drive must be linked to a door drive element which has a travel of over 360°. For instance, in some controls for ventilation in a vehicle, the valve may be in the form of a film which moves across a vent duct, the film having a window, the position of which registers more or less with the cross-section of the vent. The film itself may be spring-biased so that its end moves in one direction to valve off more or less air flow through the duct. In such arrangements, the film may be wound on a drum controlled by a drive motor. The drum may, in its travel moving the film, make more than one rotation. The control of rotation of the drum has to be such that the window or end of the film reaches a position as required by the temperature setting, for instance.

The present invention provides an servoactuator of the potentiometer feedback type in which the drive element arrives at the desired position in its numerous rotations as required by the command signal. This is accomplished in the present invention by the use of a planetary gear system which mounts a wiper on the ring gear, the wiper working against swipes of no greater than 360°.

SUMMARY OF THE INVENTION

The invention is as described in the claim language and may be summarized as comprising a resistive feedback-type servoactuator in which a motor drive is actuated by a circuit, the circuit including means to compare the voltage input from a command signal and a voltage input as determined by the position of a wiper on the ring gear of a planetary gear system, the wiper bridging across conductive and resistive strips located adjacent the ring gear.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
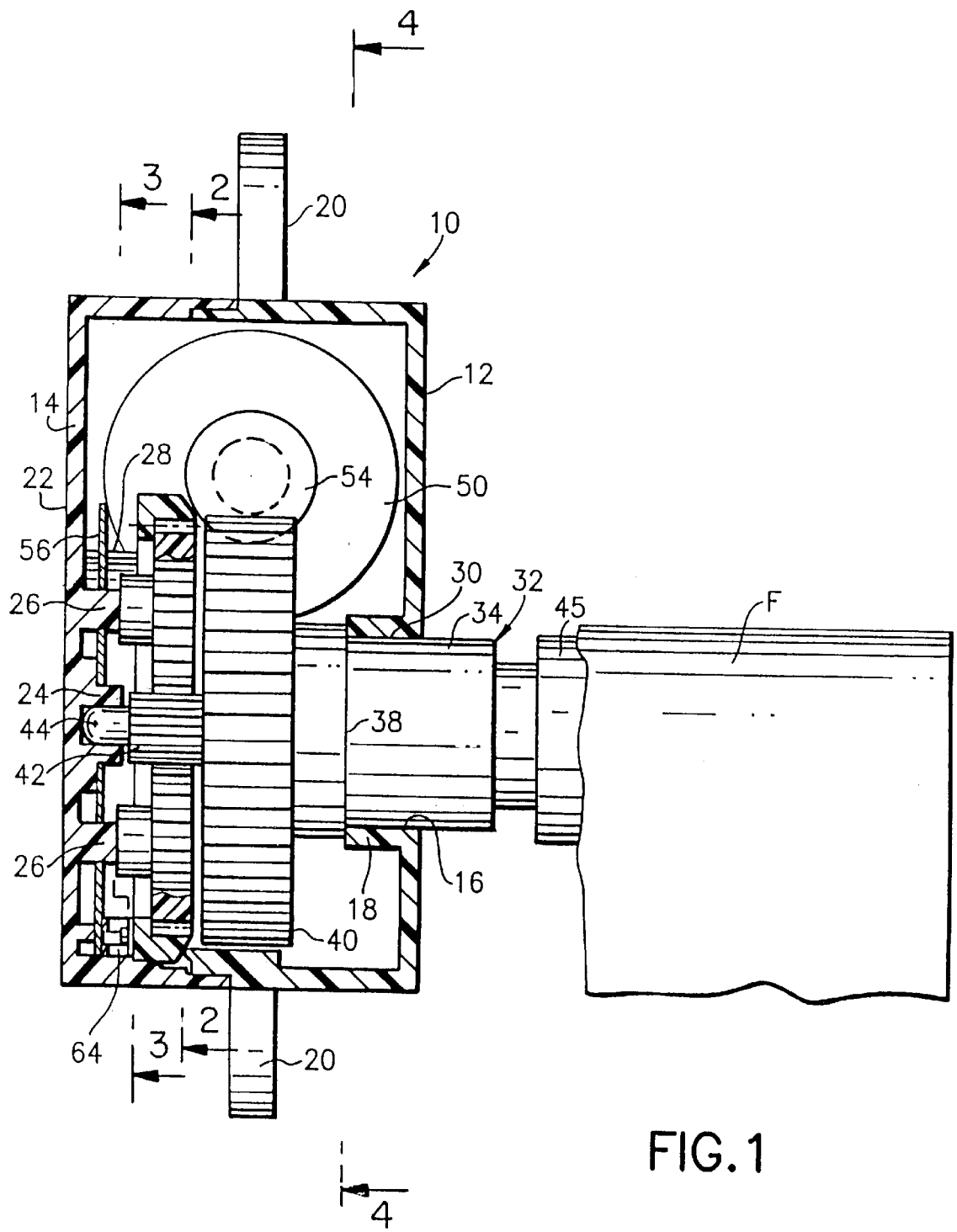
FIG. 1 is a sectional view taken on the line 1—1 of FIG. 2 showing an actuator embodying the invention.

An actuator embodying the invention is shown in FIG. 1 and designated 10. It comprises a box-shaped housing having two halves 12 and 14. The housing halves fit together as shown in FIG. 1.

Figure 4:
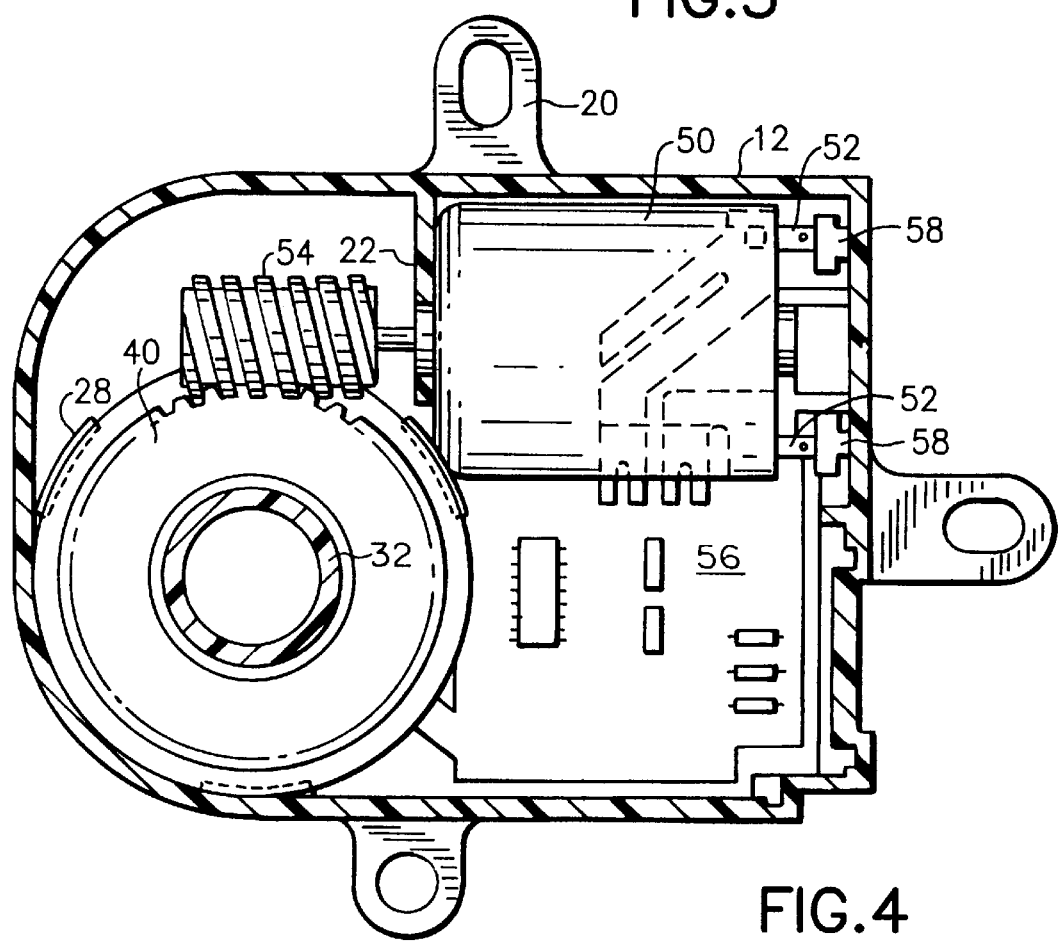
FIG. 4 is a sectional view taken on the line 4—4 of FIG. 1.

Housing half 12 is formed with a shaft opening 16 surrounded by an inward flange 18. The half 12 is provided with integral mounting pads 20 suitably apertured for mounting the unit. The housing half 12 is formed with an interior perpendicular wall 22 (FIG. 4). Half 14 is formed with a drive shaft journal 24. On opposite sides of the journal the half 14 is formed with fixed spindles 26 extending inward into the housing.

Figure 2:
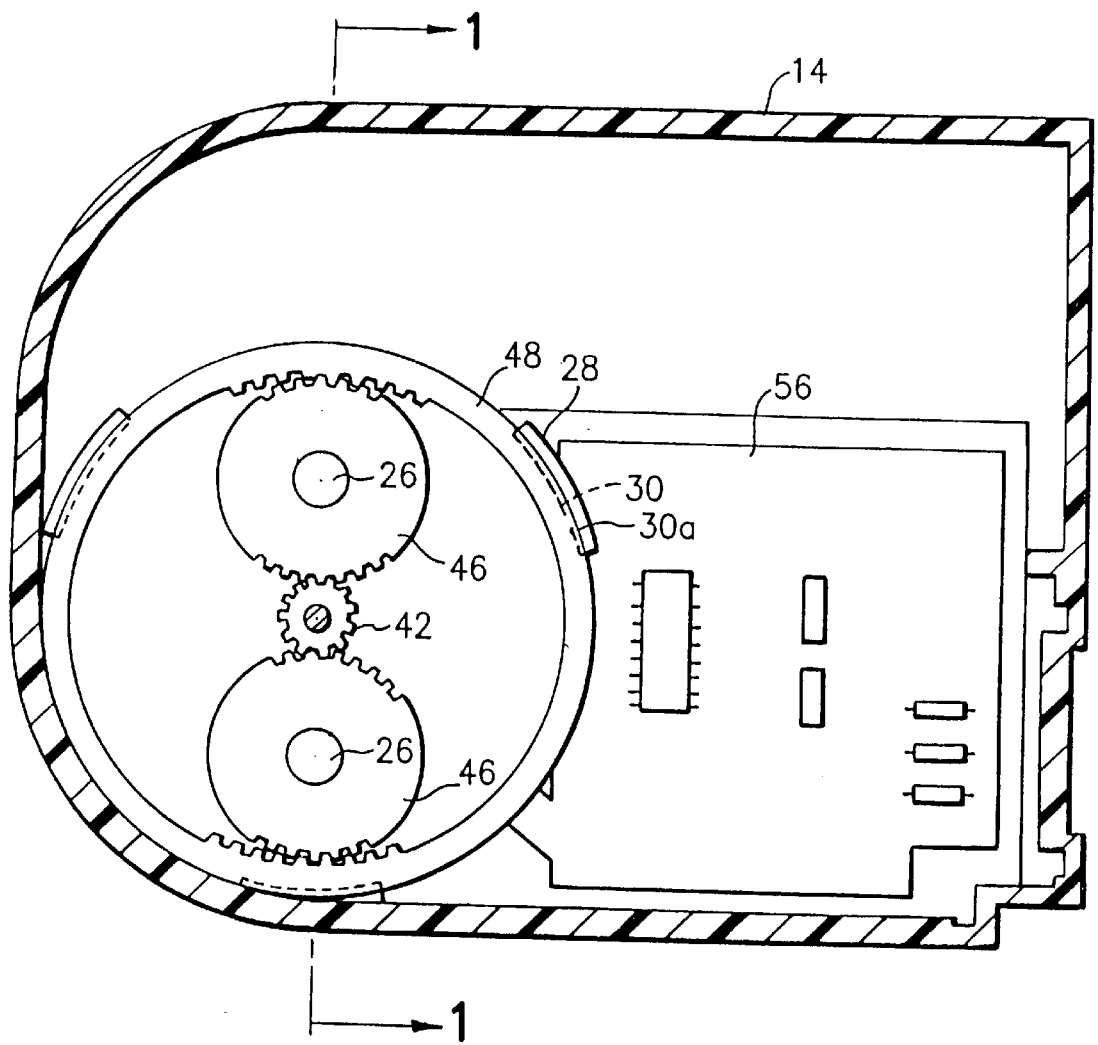
FIG. 2 is a sectional view taken on the line 2—2 of FIG. 1.

Stationed around the spindles 26 and journal 24 are the ring gear support struts 28 which are arcuate (FIG. 2). Adjacent their distal ends the struts are formed with inward ledges 30. The ledges have upward retaining surfaces 30a thereadjacent which are concentric with the axis of journal 24 and at the radius of the ring gear, to be described.

The operative parts of the assembly include the drive shaft 32 which is formed with a bearing surface 34 which extends through the housing through the opening 16. Leftward of the bearing surface 34 (FIG. 1) the drive shaft has an enlargement at 36 to provide a shoulder 38 which rides on the end of the inward flange 18. The shaft is provided with an axial helical gear 40 and an adjacent sun gear 42 and terminates in a rounded shaft end 44. Outward of the housing the drive shaft is provided with a drive drum 45.

Planet gears 46 are provided and are fitted over the spindles 26 to rotate freely thereon, the planet gears meshing with the sun gear 42. A ring gear 48 is provided and rests against ledges 30 of the ring gear struts 28 and is held against lateral movement by the retaining surfaces 30a. The inwardly facing teeth of the ring gear 48 engage the planet gears 46.

A drive motor 50 is positioned in the housing against the wall 22 (FIG. 4). The drive motor is provided with a shaft mounting a worm gear 54 which engages the helical gear 40. Disposed in the housing half 14 against the end wall thereof is the printed circuit board 56. The board 56 bottoms against the base of the journal 24 and has suitable openings to receive the spindles 26. The board is connected to motor spring contacts 58 which engage respectively terminals 52 on the end of the motor.

Figure 3:
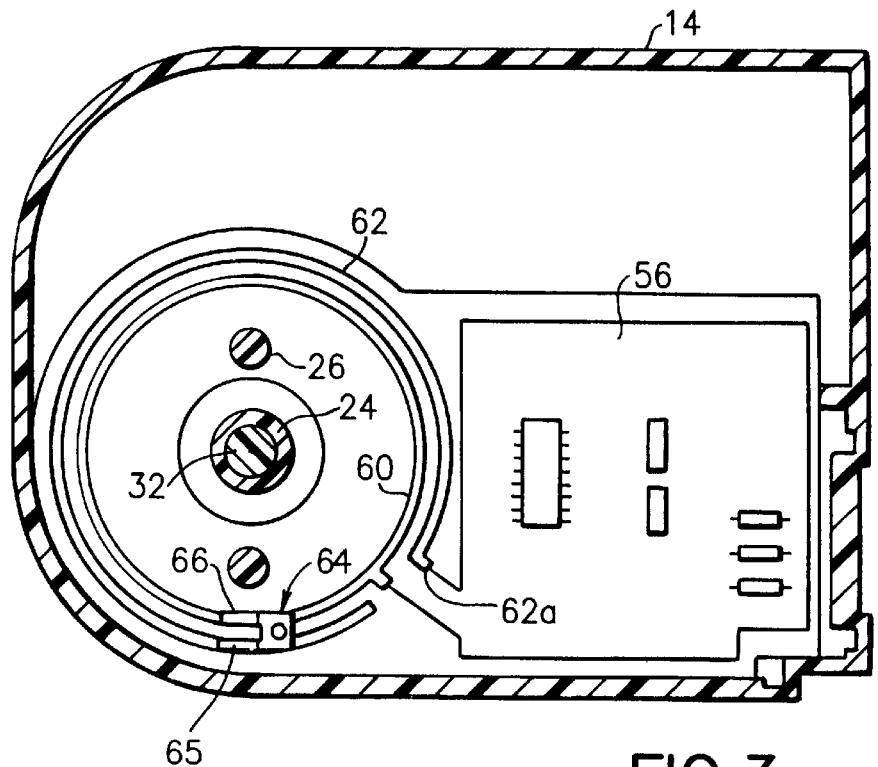
FIG. 3 is a sectional view taken on the line 3—3 of FIG. 1.

The circuit board 56 (FIG. 3) in the area adjacent the ring gear 48 carries a pair of concentric arcs, inner arc 60 which is a conductive layer and outer arc 62 which is a resistive layer. These arcs are concentric with the sun gear journal 24. Inner arc 60, a circle, is connected to the circuitry and outer arc 62 is a partial circle having a terminal 62*a* connected in the circuitry.

Mounted on the ring gear 48 and extending toward the printed circuit board 56 is the brass wiper 64 (FIG. 3) which is unitary and formed with two legs 66 and 65 side-by-side. The wiper is of spring brass and biased to engage respectively against the arcs 60, 62 as the ring gear rotates. The wiper thus serves to conduct electricity between the arcs 60, 62 at the position on the two arcs at which the wiper is at a given moment. Extent of passage of current back to the circuit board will, of course, be dependent on the length of the resistive arc 62 from the position of the wiper at a given moment to the terminal 62*a*.

In the assembly of the actuator housing the circuit board 56 is first installed in the housing half 14 against journal 22. The ring gear 48 is then installed against the ledges 30 of the ring gear struts 28 and within retaining surfaces 30*a* as to be freely rotatable. The planet gears 46 are then mounted on their spindles 26. The motor 50 is installed in the housing in position between the motor contacts 52 and wall 22. The worm gear 54 extends outward. The drive shaft 32 is installed in the opening 16 of the housing half 12 and the housing half 12 is brought into position with the other half 16 so that the drive shaft enters the journal 24. At this point the sun gear 42 engages the planetary gears 46 and the helical gear 40 engages the worm gear 54 so that the rotation of the motor effects the turning of the drive shaft. Outward of the opening 30 the drive shaft 32 is provided with the drum 45. Drum 45 is attached to the element F of the assembly which is to be driven. As an example, the element may be in the form of a film having openings to occlude to a variable degree the passage in a vent duct.

The control for the functioning of the assembly may be in the form of a dial (not shown) which may be rotated, for instance, by the driver of a vehicle to set the temperature of the environment as desired. This control may be n the form of a potentiometer which is in circuitry to place a potential across a Wheatstone bridge embodied in the circuit board 56. The position of the wiper 64 on the resistive arc 62 determines the potential against which the bridge balances and activates the motor 50 as necessary as described in the Kenny patent referred to above.

By virtue of this invention, it is possible to control by servoactuator the rotary positioning of a drive shaft at a selected point in any one of a member of rotations. This is made possible by the use of a planetary gear system in which the ring gear carries the servoactuator wiper The ring gear is supported in the assembly housing in a manner to allow free rotation without interference with the wiper function.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A potentiometer-type feedback servoactuator system for driving a driven element comprising:
   a. a housing,
   b. a circuit board in the housing including spaced concentric resistive and conductive arc layers having an axis,
   c. gear assembly including a sun gear disposed on the axis, planet gears and ring gear supported in the housing, the gears intermeshing, the ring gear carrying a conductive wiper engaging the arc layers and bridging thereacross, the planet gears being held from lateral movement with respect to the housing,
   d. inward spaced struts disposed in the housing concentrically with the axis of the sun gear, the struts being formed with ledges having retaining surfaces facing inward and equidistant from the axis, the ring gear resting against the ledges and laterally retained by the retaining surfaces,
   e. a drive shaft in the housing on the axis and mounted on the sun gear, the shaft adapted to be connected to the driven element,
   f. a drive motor in the housing and operatively coupled with the drive shaft, the motor being electrically connected to the circuit board,
   g. means in the circuit board to compare a position command signal to the position of the wiper on the layers and to energize the drive motor to rotate the drive shaft to a position of the ring gear wherein the position of the wiper on the layers corresponds to a position represented by the command signals.

2. A system as claimed in claim 1 wherein the housing is formed with inward spindles rotatably receiving the planet gears.

3. A system as claimed in claim 1 wherein the housing is formed with an inwardly facing journal, an end of the shaft being rotatably received in the journal.

* * * * *